United States Patent [19]

Aronberg et al.

[11] 4,179,753

[45] Dec. 25, 1979

[54] HEADGEAR WITH EYEGLASS SUPPORT

[76] Inventors: Sue Aronberg, 1865 NE. 117th Rd., North Miami, Fla. 33161; Gail Fein, 3165 Pine Tree Dr., Miami Beach, Fla. 33140

[21] Appl. No.: 894,742

[22] Filed: Apr. 10, 1978

Related U.S. Application Data

[63] Continuation-in-part of Ser. No. 859,836, Dec. 12, 1977, abandoned.

[51] Int. Cl.² .............................................. A42B 1/06
[52] U.S. Cl. .................................................. 2/10; 2/422;
2/DIG. 11; 351/155; 2/199
[58] Field of Search .................. 2/10, 13, 199, 185 R, 2/444, 422, 453, DIG. 11; 351/155

[56] References Cited
U.S. PATENT DOCUMENTS

| | | | |
|---|---|---|---|
| 264,574 | 9/1882 | Shone | 2/10 |
| 857,838 | 6/1907 | Shaw | 2/453 X |
| 1,133,056 | 3/1915 | Pachner | 2/10 |

FOREIGN PATENT DOCUMENTS 1319413  1/1963  France ...................................... 351/155

Primary Examiner—Peter P. Nerbun
Attorney, Agent, or Firm—Shapiro & Shapiro

[57] ABSTRACT

An eyeglass support and a hat to be sold separately from but to be used in combination with a pair of glasses; the hat includes a forwardly projecting bill portion and a head encircling band having a front zone and a pair of side band zones; on the outside surface of the side zones of the hat headband, supports are provided to receive and support the temples of a pair of glasses; and, additionally, a clip is provided on the front zone of the hat headband to clip releasably about the nose piece of a pair of glasses; the glasses are thus adapted to be displayed and carried on the hat above the bill with the temples supported by the side zones of the hat and the nose piece supported by the clip.

22 Claims, 5 Drawing Figures

U.S. Patent  Dec. 25, 1979  4,179,753
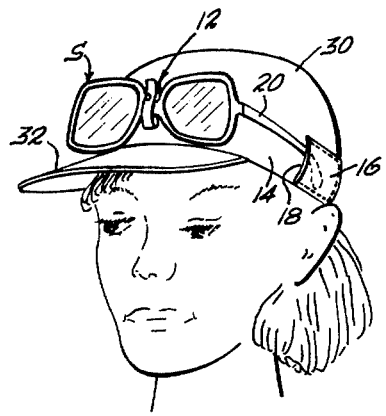
Fig.1
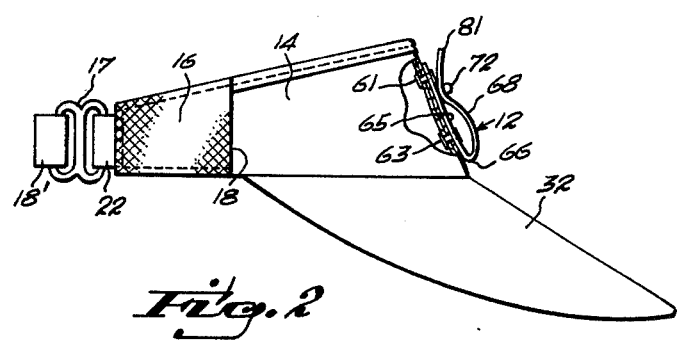
Fig.2
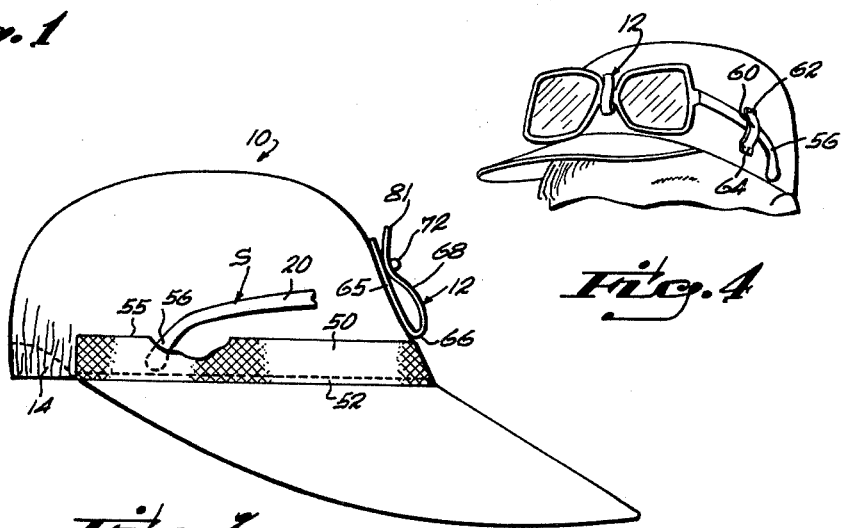
Fig.3
Fig.4
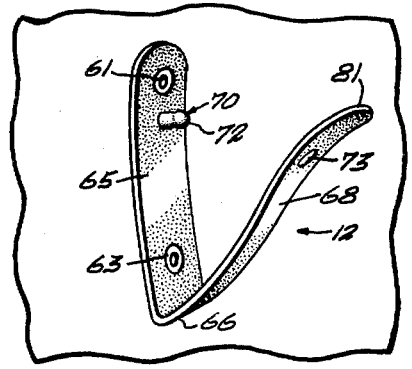
Fig.5

HEADGEAR WITH EYEGLASS SUPPORT

This application is a continuation-in-part of our co-pending earlier filed patent application Ser. No. 859,836 filed Dec. 12, 1977, now abandoned.

FIELD OF THE INVENTION

This invention relates to headgear and, more particularly, to a hat having a headband with a support means on it for removably supporting a pair of glasses, such as sunglasses.

BACKGROUND OF THE INVENTION

As is perhaps well known, many persons use sunglasses to shade their eyes when playing tennis, jogging, or engaging in other sports. Oftentimes in these sports a hat is worn, such as is shown in FIG. 1; other times a hat band without a head crown but with an eye shade or a bill is worn. At times, a person may prefer to wear the sunglasses; or at other times, the wearer may prefer to store them in a convenient location. This invention comprises a head encircling band on which eyeglasses are mounted for convenient use or display and storage. The glasses are securely held during all type of vigorous activity and sports such as horseback riding, jogging, tennis and other sports. The display aspect is considered by many to be a significant style feature.

In the past, efforts have been made for the convenient storage of eyeglasses, such as is shown in U.S. Pat. No. 2,766,657 which is for glasses which are especially provided with a clip to engage the hair and support the spectacles. Other types of devices have been utilized for supporting eyeglasses on the head of a wearer such as that disclosed in U.S. Pat. No. 1,647,124; and, in the past, eyeglasses have been connected to hats in various ways, such as is shown in U.S. Pat. No. 264,574 with a hinge connection, as is also typical of U.S. Pat. No. 857,838 and U.S. Pat. No. 1,514,111.

OBJECTS OF THE PRESENT INVENTION

It is an object of the present invention to provide headgear comprising a headband that supports eyeglasses above the brim region of the headgear. Side zones of the headband are provided with receptacles into which the free ends of temples of a pair of spectacles may be inserted, and a front zone of the headband is provided with clip means to support the bridge or nose piece of the glasses, so that the headgear may securely but removably hold a wide variety of shapes and sizes of eyeglasses for optional use. The type of receptacles which receive the ends of the temples may be front opening or top opening pocket structures as in FIGS. 1 and 3, respectively, or loops, as in FIG. 4.

In accordance with these and other objects which will become apparent hereinafter, the instant invention will now be described with reference to the accompanying drawings, in which:

DESCRIPTION OF THE DRAWINGS

FIG. 1 is a perspective view illustrating the use of one form of the instant invention;

FIG. 2 is a side elevation view of one embodiment of the invention;

FIG. 3 is a side elevation view, partly broken away, of another embodiment of the invention;

FIG. 4 is a view similar to FIG. 1 and illustrating a slightly modified support means for the temples of the spectacles and FIG. 5 is a perspective view of preferred clip means utilized in the invention.

DESCRIPTION OF THE PREFERRED EMBODIMENT

Referring to the drawings, wherein like reference characters designate like or corresponding parts throughout the several views and referring particularly to FIG. 3, it is seen that the invention comprises headgear including a band 14 adapted to encircle the head of a wearer between a brim region and a crown region. As will be seen hereinafter, means are provided at a front zone and opposite side zones of band 14 for supporting eyeglasses S on the headgear. In the embodiments of FIGS. 1, 3, and 4, the headgear is in the form of a hat, generally designated in FIG. 3 by numeral 10. As shown in FIG. 1, the band 14 may extend upwardly from the brim region of the hat to form a crown 30, and the hat may include a bill or brim 32 at the brim region. The glasses S are held in place by a clip, generally designated by the numeral 12 in each of the views and shown particularly in FIG. 5. The clip may be disguised as a decorative piece resembling a flower. In the embodiment shown in FIGS. 1 and 2, band 14 encircling the head of the wearer is provided with forwardly opening pockets 16 having a front opening mouth 18 into which the free ends of temples 20 of the glasses S are adapted to be inserted. In FIG. 2 the crown is not included, and the band 14 includes means 17 for connecting ends 18' and 22 of the side zones of the headband together. In some embodiments, the ends may simply be tied together. In FIG. 3, the headband 14 is provided with a decorative trim 50 with an edge 52 secured to the headband and the same is open at the top along the edge 55 so that the free ends 56 of the temples 20 are adapted to be received therein. In the embodiment shown in FIG. 4, on the headband or head encircling portion of the hat, loops 60 are provided having stitch means 62 and 64 securing the same to the headband and into which the free ends 56 of the temples are adapted to be inserted.

Referring to FIG. 5 it is seen that the clip means is riveted to the hat at an upper rivet 61 and lower rivet 63 which are spaced from one another on one leg 65 which is hingedly connected at a hinge zone 66 to an outer leg 68 and that on the inner leg there is a forwardly projecting stud 70 provided with an enlarged terminal end 72 sized for snug passage through an opening companionately located on the outer leg 68 and designated by the numeral 73. It is apparent from the drawings that when the headgear is normally positioned on the erect head of the wearer, the clip means 12 extends upwardly between the brim region and the crown region of the headgear to encompass the nose piece of the eyeglasses, with the lenses of the eyeglasses arranged upright at opposite sides of the clip means and with the temples 20 extending rearwardly above the brim region and into the receptacles (pockets or loops).

To use the glasses, the wearer of the headgear simply tugs on the outwardly extending or bowed tab end 81 of the clip 12, unsnapping the stud from the hole (while the rivets hold securely to the headgear) and the glasses may then be slid off the band 14 from the supports. When not in use the sunglasses may be stored on the headgear in a convenient out of the way location. In accordance with the invention a combination of a headgear and spectacles are provided. The glasses are those of the wearer, either prescription or regular sunglasses, and the wearer may use the glasses of the style which are most preferred for the particular outfit being worn and, at will, change to other glasses owned by the wearer.

In the preferred embodiment the clip means is of low density polypropelene material providing a long-lasting molded hinge means having a normal configuration shown in FIG. 5 and yieldable about the hinge line 66 for hooked-up engagement of the legs as shown in FIG. 1.

In the preferred embodiment the overall height or length of the clip means is about 4¼ inches and that of each leg about 2⅛ inches and the distance across each leg is about ½ inch, the same being relatively thin and about 1/16 inch thick. The clip means 12 is of one-piece molded plastic strip formed of low density polypropelene, and the button or stud is located between the rivets on one side of the foldline of the leg which is affixed to the hat, and the opposite side is hingedly connected to it.

What is claimed is:

1. Headgear comprising a band adapted to encircle the head between a brim region and a crown region, the band having a front zone and opposite side zones, all of said zones being above the brim region, receptacle means on the band having an opening at each side zone for receiving corresponding temples of eyeglasses, and clip means on the band at the front zone for receiving and releasably closing about the nose piece of the eyeglasses, the clip means extending upwardly between the brim region and the crown region to encompass the nose piece with the lenses of the eyeglasses arranged upright at opposite sides thereof and with the temples extending rearwardly above the brim region and into the openings, respectively.

2. Headgear in accordance with claim 1, wherein the receptacle means are pockets at the side zones that open away from the brim region so that the free ends of the temples may be readily inserted therein and withdrawn therefrom when the nose piece is free of the clip means.

3. Headgear in accordance with claim 1, wherein the receptacle means are pockets at the side zones that open toward the front zone of the band so that the free ends of the temples may be readily inserted therein and withdrawn therefrom when the nose piece is free of the clip means.

4. Headgear in accordance with claim 1, wherein the receptacle means are loops at the side zones open so that the free ends of the temples may be readily inserted therein and withdrawn therefrom when the nose piece is free of the clip means.

5. Headgear in accordance with claim 1, wherein the clip means comprises a pair of legs hinged to each other at a bottom region and adapted to move toward and away from each other at a top region.

6. Headgear in accordance with claim 5, wherein one of the legs has a stud adjacent to its top region and the other of the legs has a hole positioned to receive the stud, the stud having an enlargement that snaps into the hole.

7. Headgear in accordance with claim 6, wherein the legs of the clip means are formed integrally from a plastic strip and merge with each other at a hinge line, the leg with the stud being attached to the band with the stud projecting forwardly therefrom.

8. Headgear in accordance with claim 7, wherein the clip means is formed of low density polypropylene.

9. Headgear in accordance with claim 1, wherein the headgear has a brim at the brim region.

10. Headgear in accordance with claim 1, wherein the band extends over the crown region.

11. Headgear in accordance with claim 1, wherein the band has a rear zone with means for connecting the side zones of the band.

12. In combination with eyeglasses, headgear comprising a band adapted to encircle the head between a brim region and a crown region, the band having a front zone and opposite side zones, all of said zones being above the brim region, receptacle means on the band having an opening at each side zone receiving corresponding temples of the eyeglasses, and clip means on the band at the front zone receiving and releasably closing about the nose piece of the eyeglasses, the clip means extending upwardly between the brim region and the crown region and encompassing the nose piece of the eyeglasses with the lenses of the eyeglasses arranged upright at opposite sides thereof and with the temples extending rearwardly above the brim region and into the openings, respectively.

13. A combination in accordance with claim 12, wherein the receptacle means are pockets at the side zones that open away from the brim region so that the free ends of the temples may be readily inserted therein and withdrawn therefrom when the nose piece is free of the clip means.

14. A combination in accordance with claim 12, wherein the receptacle means are pockets at the side zones that open toward the front zone of the band so that the free ends of the temples may be readily inserted therein and withdrawn therefrom when the nose piece is free of the clip means.

15. A combination in accordance with claim 12, wherein the receptacle means are loops at the side zones open so that the free ends of the temples may be readily inserted therein and withdrawn therefrom when the nose piece is free of the clip means.

16. A combination in accordance with claim 12, wherein the clip means comprises a pair of legs hinged to each other at a bottom region and adapted to move toward and away from each other at a top region.

17. A combination in accordance with claim 16, wherein one of the legs has a stud adjacent to its top region and the other of the legs has a hole positioned to receive the stud, the stud having an enlargement that snaps into the hole.

18. A combination in accordance with claim 17, wherein the legs of the clip means are formed integrally from a plastic strip and merge with each other at a hinge line, the leg with the stud being attached to the band with the stud projecting forwardly therefrom.

19. A combination in accordance with claim 18, wherein the clip means is formed of low density polypropylene.

20. A combination in accordance with claim 12, wherein the headgear has a brim at the brim region.

21. A combination in accordance with claim 12, wherein the band extends over the crown region.

22. A combination in accordance with claim 12, wherein the band has a rear zone with means for connecting the side zones of the band.

* * * * *